Figure 1:
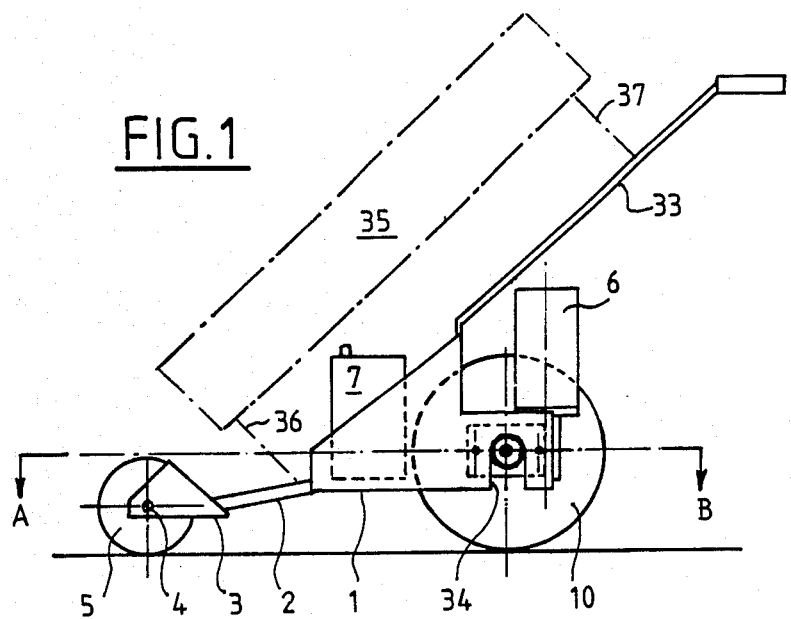

United States Patent [19]

Laguilharre

[11] Patent Number: 4,848,497
[45] Date of Patent: Jul. 18, 1989

[54] REMOVABLE POWER UNIT FOR LOAD CARRYING VEHICLES SUCH AS GOLF CADDIES AND A LOAD CARRYING VEHICLE EQUIPPED WITH THIS POWER UNIT

[76] Inventor: Pierre R. Laguilharre, 6, rue Robin, Enghien les Bains, France

[21] Appl. No.: 291,372

[22] Filed: Dec. 23, 1988

[30] Foreign Application Priority Data

Apr. 11, 1986 [FR] France ............................ 8605198

[51] Int. Cl.⁴ ................................................ B60K 1/00
[52] U.S. Cl. .................................................... 180/65.6
[58] Field of Search ................ 180/11, 12, 19.1, 19.2, 180/19.3, 65.1, 65.6, 65.7; 280/DIG. 5, DIG. 6

[56] References Cited

U.S. PATENT DOCUMENTS

| | | | |
|---|---|---|---|
| 3,330,371 | 7/1967 | Seaman | 180/65.6 |
| 3,815,699 | 6/1974 | Ganskopp et al. | 280/DIG. 5 |
| 3,907,056 | 9/1975 | Thomas, III | 280/DIG. 5 |
| 4,130,172 | 12/1978 | Moody | 180/65.6 |

Related U.S. Application Data

[63] Continuation of Ser. No. 32,187, Mar. 30, 1987, abandoned.

Primary Examiner—Charles A. Marmor
Assistant Examiner—Richard Camby
Attorney, Agent, or Firm—Schiller, Pandiscio and Kusmer

[57] ABSTRACT

The present invention provides a removable power unit for a load carrying vehicle such as a golf caddy, having a drive motor coupled to a reduction gear driving in rotation a drive shaft having a drive wheel at each of its ends, the drive shaft being formed of two shaft sections extending respectively on each side of the reduction gear, characterized in that at least one of the shaft sections is mounted for rotation inside a sleeve through a bearing inserted in this sleeve, this latter being secured by one of its ends to the casing of the reduction gear. It also relates to a load carrying vehicle equipped with such a power unit.

10 Claims, 4 Drawing Sheets

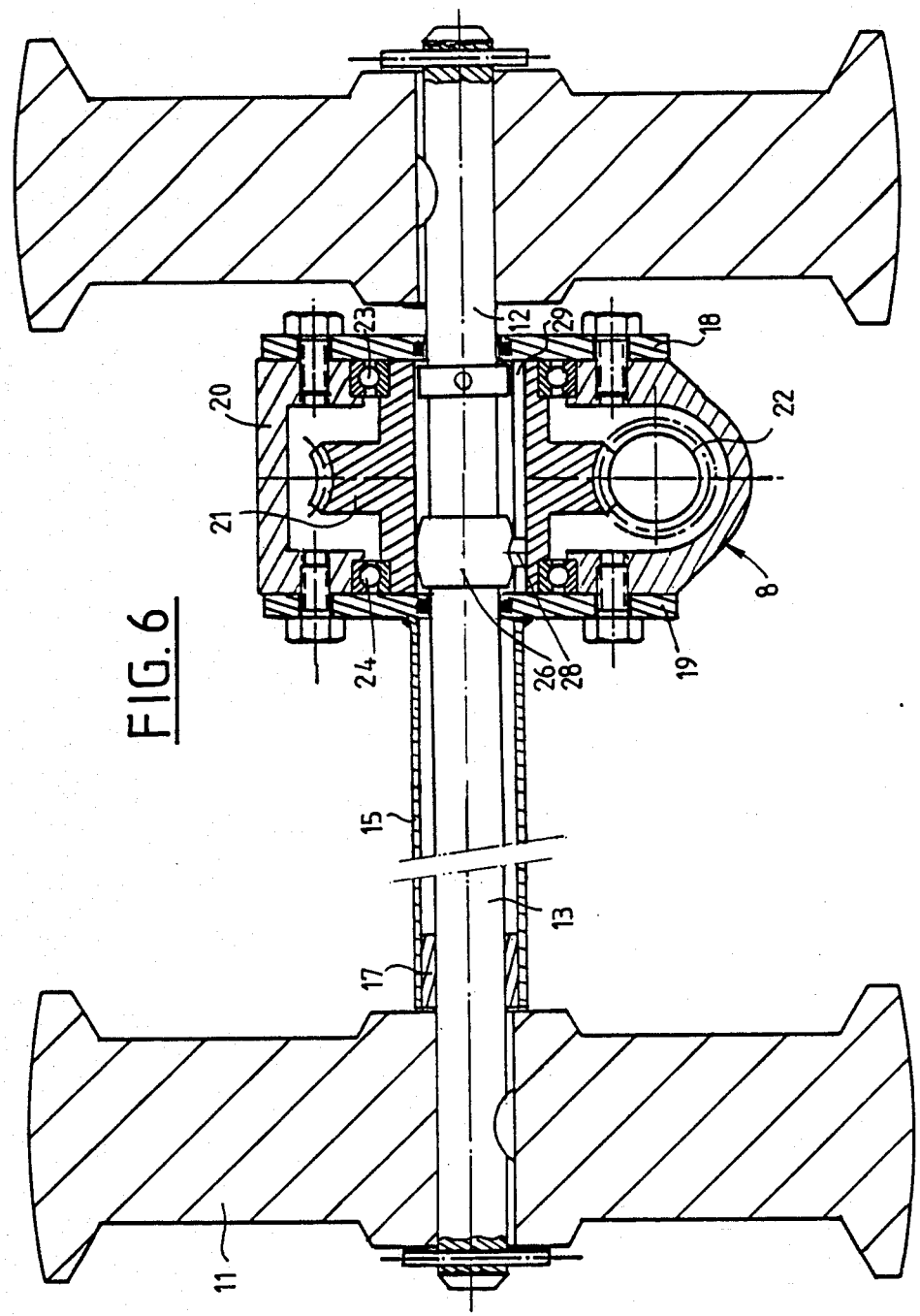

REMOVABLE POWER UNIT FOR LOAD CARRYING VEHICLES SUCH AS GOLF CADDIES AND A LOAD CARRYING VEHICLE EQUIPPED WITH THIS POWER UNIT

The present invention relates to a removable power unit for a load carrying vehicle such as a golf caddy, this unit including a drive motor coupled to a reduction gear causing rotation of a drive shaft having a drive wheel at each of its ends, said drive shaft being formed of two shaft sections extending respectively on each side of said reduction gear.

Power units are already known for load carrying vehicles in which the drive shaft driven in rotation through a reduction gear is intended to be supported by one or more bearings permanently fixed to the chassis of the load carrying vehicle.

This construction with one or two bearings permanently fixed to the chassis means that the power unit is also permanently fixed thereto, which requires precise alignment of the axis of the bearings of the reduction gear with the axis of the load carrying bearings and, therefore accurate machining of these latter. Furthermore, this or these bearings must be disposed side by side with the drive wheels so as to reduce or cancel out the cantilever thereof, which requires a large sized chassis.

Furthermore, there lacks the possibility of rapid removal of the power unit from the chassis of the load carrying vehicle, as well as rapid standard exchange and/or repair of the power unit.

Furthermore, the cost price of the assemblies is high because of the need for precise machining of the bearings supporting the drive wheels and because of the necessity of using a load carrying chassis of great width.

The aim of the present invention is to overcome these drawbacks and for this it provides a power unit of the type defined in the first paragraph of this description which is characterized in that at least one of the shaft sections is rotatably mounted inside a sleeve by means of a bearing inserted in this sleeve, this latter being integrally secured by one of its ends to the reduction gear casing.

The power unit thus described forms an independent unit and not permanently fixed to the load carrying vehicle which it is intended to equip with all the advantages that that entails.

In accordance with the invention, the sleeve extends preferably to the immediate vicinity of the wheel carried by the shaft section inserted in said sleeve, the bearing being situated in the immediate vicinity of the free end of this sleeve. Thus, each bearing is simply inserted in the end of the sleeve without subsequent machining and with a negligible cantilever of the drive wheels, providing very easy rapid removal of the power unit from the chassis of the load carrying vehicle. The result is an appreciably reduced cost price of the assembly of the vehicle.

In a first variant, the two shaft sections are of the same length in which case it is preferable for each section to be mounted rotatably in a sleeve equipped with its bearing. In this variant, the motor coupled to the reduction gear is placed substantially in the longitudinal axis of the chassis of the load carrying vehicle. In a second variant, the two shaft sections are of different lengths in which case it is preferable for only the longest shaft section to be mounted for rotation in a sleeve equipped with its bearing supporting one of the drive wheels, the bearings of the reduction gear then serving as support bearing for the other drive wheel.

The reduction gear of the power unit of the invention may in particular be a worm gear.

The wheel of the worm gear may more particularly be of the hollow shaft type, each shaft section then being hinged to this hollow shaft by a ball joint disposed in the hollow shaft and connected thereto by a drive means.

The wheel of the worm gear may in a variant be of the solid shaft type, at least one of the shaft sections then being hinged to this solid shaft through a universal joint.

The present invention relates moreover to a load carrying vehicle such as a golf caddy, having a chassis and being characterized in that it further includes the above described power unit, said chassis being provided with means for removably securing it to at least one sleeve of said power unit. These securing means may for example be formed by notches adapted for receiving said sleeve.

Figure 2:
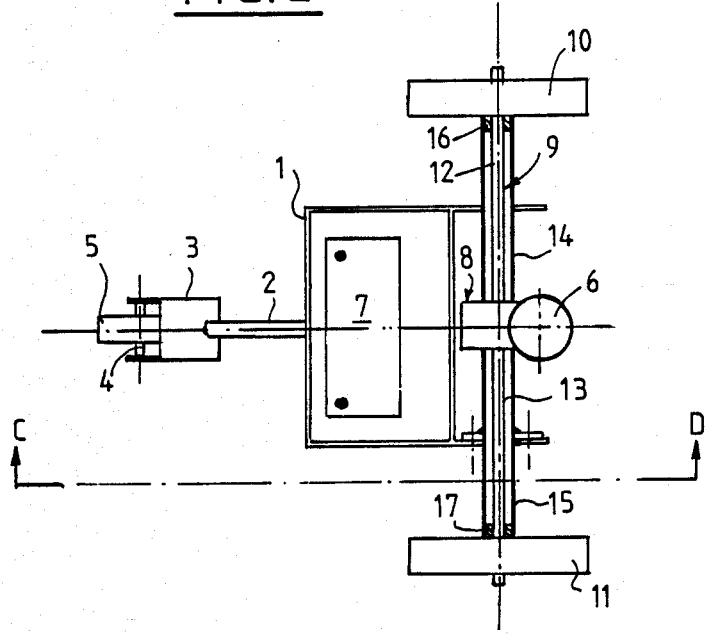

Several embodiments of the invention will be described hereafter by way of non limitative examples, with reference to the accompanying drawings in which:

FIG. 1 is a schematical sectional view through line CD of FIG. 2 and showing a power unit coupled to a load carrying vehicle, FIG. 2 is a schematical sectional view through line AB of FIG. 1, the power unit including two shaft sections and two sleeves, respectively of the same length.

Figure 3:
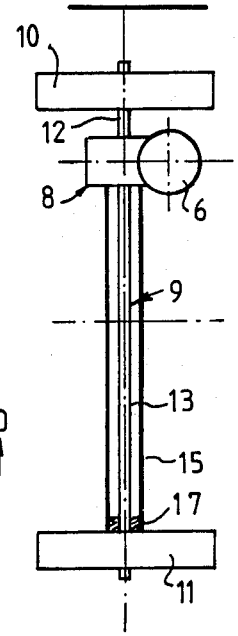
Figure 4:
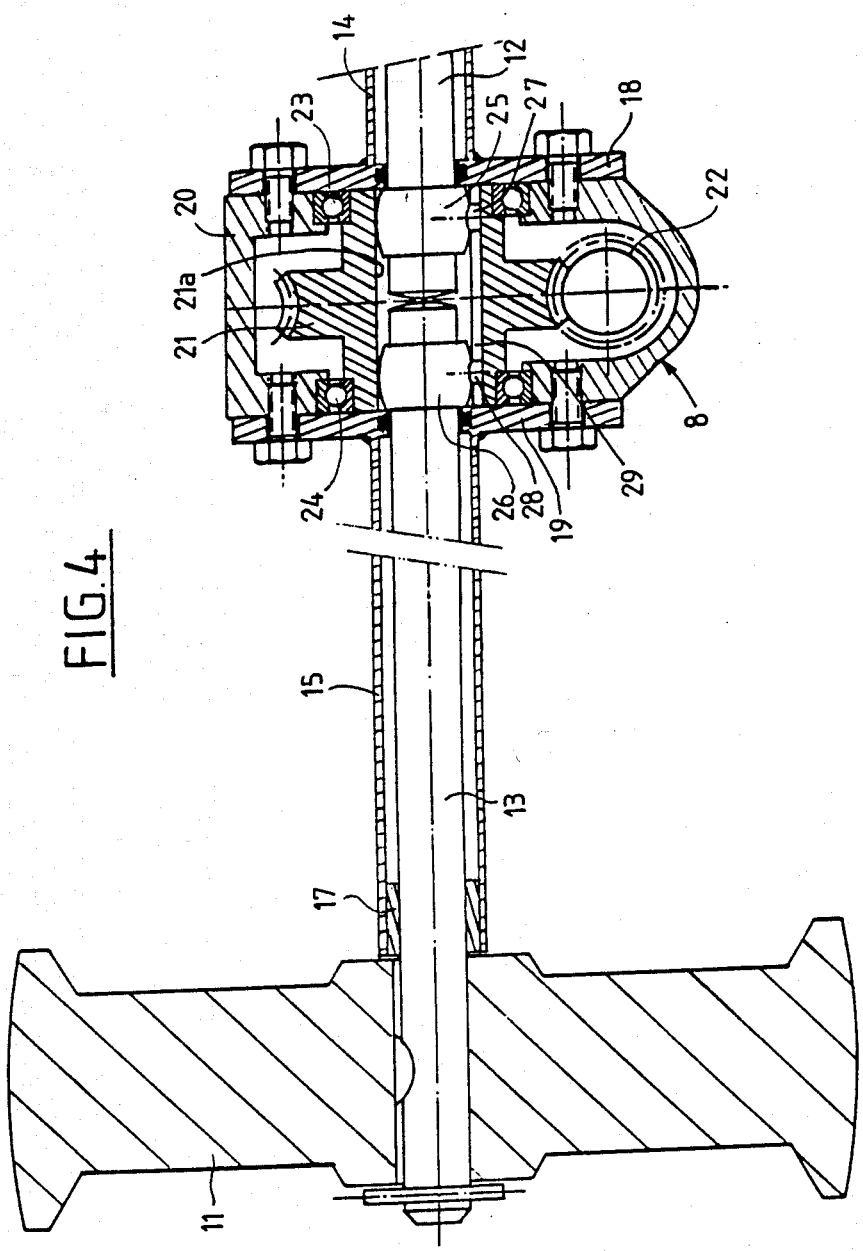
Figure 5:
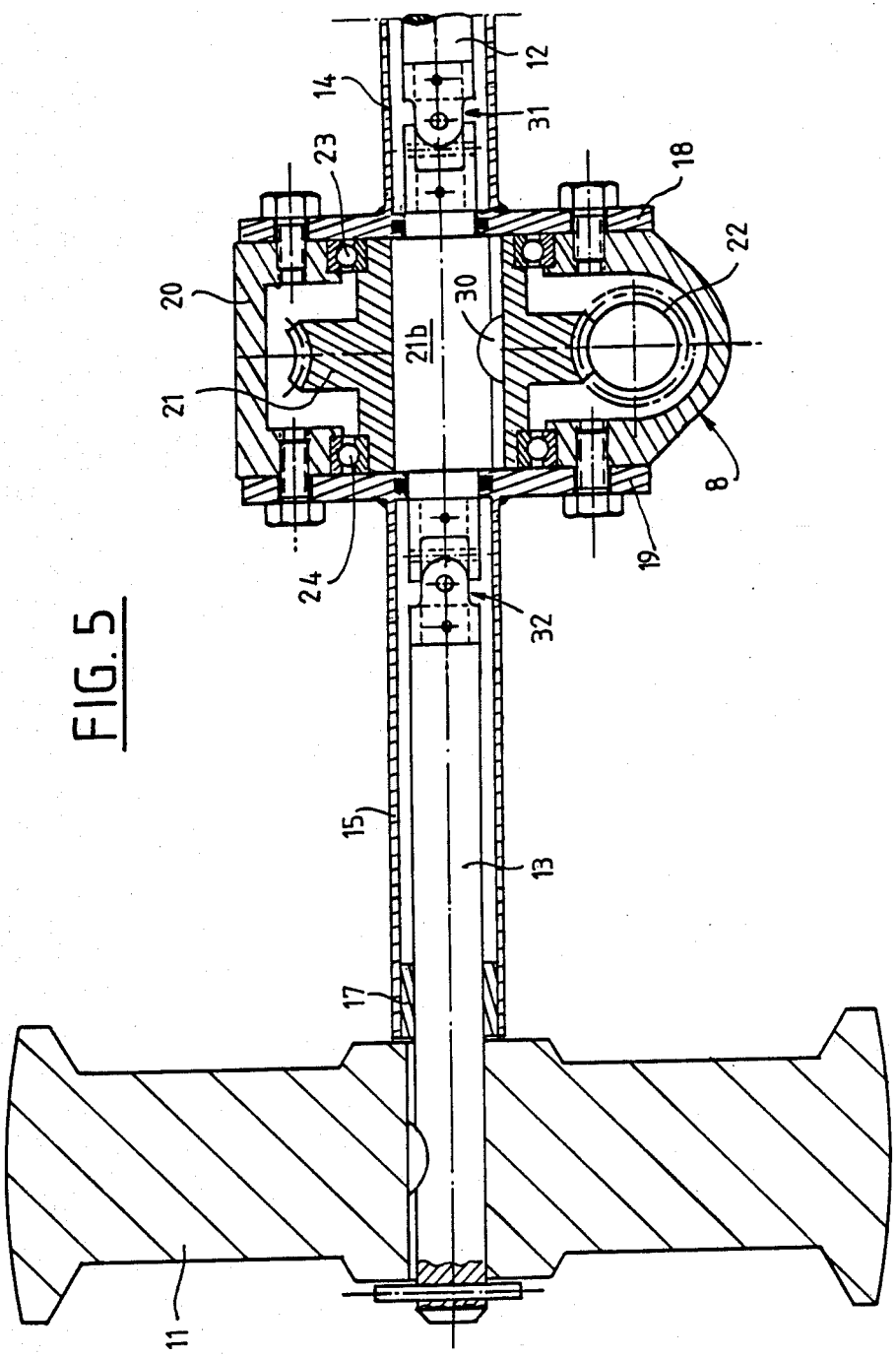

FIG. 3 is a schematical view in longitudinal section of a power unit having two shaft sections of different lengths, only the longest shaft section being mounted in a sleeve, FIG. 4 is a detailed view on a larger scale of the power unit equipping the vehicle shown in FIGS. 1 and 2, with a worm gear the wheel of which comprises a hollow shaft, FIG. 5 is a detailed view on a larger scale of the power unit equipping the vehicle shown in FIGS. 1 and 2, with a worm gear the wheel of which comprises a solid shaft, and FIG. 6 is an enlarged detailed view of the power unit shown in FIG. 3, with a worm gear the wheel of which comprises a hollow shaft.

The load carrying vehicle, for example a golf caddy, shown in FIGS. 1 and 2 includes, in a way known per se, a chassis 1 whose front part is connected by a rod 2 to a support 3 receiving the axis 4 of a non drive bearing wheel 5 of a diameter less than that of the drive wheels 10, 11, which will be discussed hereafter.

This vehicle further includes, at the rear of the chassis, a power unit including an electric drive motor 6, fed by a battery 7 and coupled to a reduction gear 8 rotatably driving a drive shaft 9, each end of which is provided with a drive wheel 10, 11. This shaft 9 is formed of two shaft sections 12, 13 disposed respectively on each side of the reduction gear 8.

In accordance with the present invention, one at least of the shaft sections 12, 13 is mounted for rotation inside a sleeve. More precisely, in the embodiment illustrated in FIGS. 2, 4 and 5, the two sections 12, 13 are of the same length and are mounted respectively for rotation inside sleeves 14, 15 by means of bearings 16, 17 inserted in said sleeves, these latter being fixed by one of their ends respectively to flanges 18, 19 secured to the lateral parts of the casing 20 of the reduction gear 8.

Furthermore, it will be noted that sleeves 14, 15 extend from said flanges to the immediate vicinity of wheels 10, 11, the bearings 16, 17, being situated in the immediate vicinity of the free end of said sleeves so that the wheels 10, 11 are supported by these bearings with a negligible cantilever with respect thereto.

In the embodiment shown in FIG. 4, the reduction gear 8 includes a slow wheel 21 with hollow shaft 21a, driven by an endless screw 22 in direct engagement with the shaft of motor 6. This slow wheel 21 is mounted for rotation on casing 20 through two ball bearings 23, 24 and rotates the two shaft sections 12, 13, independent of each other, respectively through two ball joints 25, 26 mounted in the hollow shaft of wheel 21, carried respectively by the free end of each section 12, 13 and each having a drive finger 27, 28 fitting in a keying groove 29 provided on said hollow shaft 21a.

In the embodiment shown in FIG. 5, the reduction gear 8 has the same structure as that of the reduction gear 8 shown in FIG. 4, except that the slow wheel 21 has a solid shaft 21b, this latter being driven in rotation by wheel 21 by means of a key 30. Furthermore, the ends of this solid shaft 21b are respectively in engagement with the free ends of shaft sections 12, 13 through universal joints 31, 32 outside the casing 20 of the reduction gear.

As shown in FIGS. 3 and 6, the shaft sections 12, 13 may in a variant be of different lengths. In this embodiment, the reduction gear 8 has the same structure as that of the reduction gear 8 shown in FIG. 4, the shaft sections 12, 13 are connected together so as to form a single shaft, only the ball joint 26 with its drive finger 28 has been kept and only the shaft section 13 is mounted for rotation in its sleeve 15 equipped with the bearing 17, wheel 10 being supported directly by the bearings 23, 24 of the reduction gear. The above described vehicle in its different embodiments is completed by a guide arm 33 at the rear of chassis 1 and a control system (not shown) incorporated at the end of this guide arm 33, for connecting the battery 7, through a potentiometer, to the motor 6. The chassis 1 is removably mounted on sleeves 14, 15 or only on sleeve 15 in the case of the embodiments shown in FIGS. 3 and 6, by means of a rapid release securing means. This securing means may for example consist of two notches 34 provided in the chassis 1 and engaging on the sleeve 14, 15. Because of the rigidity of this latter, the assembly formed by the chassis and the power unit also has good rigidity despite the obvious independence of the power unit. Finally, the vehicle includes a receptacle 35 for receiving the load to be transported and which is fixed by uprights 36, 37 mounted respectively on the rod 2 and the guide arm 33.

What is claimed is:

1. A load carrying vehicle, such as a caddy, said vehicle comprising:
   a power unit including a drive motor, a casing, a reduction gear disposed in said casing, a pair of drive wheels, a drive shaft including at least two shaft sections which extend respectively on each side of said reduction gear and drivingly couple said gear to said drive wheels, at least one sleeve secured between said casing and one of said drive wheels, and bearings for rotatably supporting at least one of said shaft sections in said sleeve; and
   a chassis including securing means for removably securing said chassis to said sleeve of said power unit so that said power unit can easily be removed from said chassis.
2. A vehicle according to claim 1, wherein said drive wheels are respectively mounted for rotation with said shaft sections, said sleeve extends from said casing to the immediate vicinity of one of said drive wheels and said bearings are positioned in the immediate vicinity of the ends of said sleeve.
3. A vehicle according to claim 2, wherein said securing means includes a pair of spaced-apart notches formed in said chassis and sized to engage said sleeve.
4. A vehicle according to claim 2, wherein said two shaft sections are of different lengths, and the longer of said shaft sections is rotatably supported in said sleeve.
5. A vehicle according to claim 2, further comprising a second sleeve secured between said casing and the other of said drive wheels and additional bearings for rotatably supporting the other of said shaft sections in the other of said sleeves.
6. A vehicle according to claim 5, wherein said second sleeve extends from said casing to the immediate vicinity of the other of said drive wheels and said additional bearings are positioned in the immediate vicinity of the ends of said second sleeve.
7. A vehicle according to claim 6, wherein said securing means includes a pair of spaced-apart notches formed in said chassis and sized to respectively engage said sleeves.
8. A vehicle according to claim 5, wherein said two shaft sections are of the same length.
9. A vehicle according to claim 1, further including a ball joint, wherein said reduction gear is a worm gear, said worm gear includes a hollow shaft and said ball joint is disposed in said hollow shaft for coupling said drive motor to said worm gear.
10. A vehicle according to claim 1, further including a universal joint, wherein said reduction gear is a worm gear, said worm gear includes a solid shaft and said universal joint couples said drive motor to said worm gear.

* * * * *